United States Patent [19]

Yamada et al.

[11] 4,347,157
[45] Aug. 31, 1982

[54] CATALYSTS FOR THE POLYMERIZATION OF OLEFINS

[75] Inventors: Yasuharu Yamada, Osaka; Kiyoshi Kawai, Toyonaka, both of Japan

[73] Assignee: Sumitomo Chemical Company, Limited, Osaka, Japan

[21] Appl. No.: 138,148

[22] Filed: Apr. 7, 1980

[30] Foreign Application Priority Data

Apr. 25, 1979 [JP] Japan ................................. 54-51641
Jan. 28, 1980 [JP] Japan ................................. 55-9200

[51] Int. Cl.$^3$ .............................. C08F 4/64; C08F 4/68
[52] U.S. Cl. .............................. 252/429 B; 252/429 C; 252/431 R; 252/431 P; 526/139; 526/142; 526/151; 526/155
[58] Field of Search ........... 252/429 B, 429 C, 431 R, 252/431 P

[56] References Cited

U.S. PATENT DOCUMENTS

| | | | |
|---|---|---|---|
| 4,107,416 | 8/1978 | Giannini et al. | 252/429 C X |
| 4,159,965 | 7/1979 | Sakurai et al. | 252/429 B |
| 4,202,953 | 5/1980 | Matsuura et al. | 252/429 C X |
| 4,223,117 | 9/1980 | Sano et al. | 252/429 C X |
| 4,223,118 | 9/1980 | Tsubaki et al. | 252/429 B X |

FOREIGN PATENT DOCUMENTS

| | | |
|---|---|---|
| 1401708 | 7/1975 | United Kingdom . |
| 1539175 | 1/1979 | United Kingdom . |
| 1542224 | 3/1979 | United Kingdom . |
| 1542820 | 3/1979 | United Kingdom . |
| 2016020 | 9/1979 | United Kingdom . |
| 2020672 | 11/1979 | United Kingdom . |

*Primary Examiner*—Patrick Garvin
*Attorney, Agent, or Firm*—Stevens, Davis, Miller & Mosher

[57] ABSTRACT

Solid catalyst components produced by reacting an organomagnesium compound with an alkoxy compound of the formula,

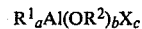

wherein $R^1$ and $R^2$ are each a hydrocarbon group having 1 to 20 carbon atoms, X is a halogen atom and a, b and c are numbers satisfying the equations at the same time, $0 \leq a < 3$, $0 < b \leq 3$, $0 \leq c < 3$, and $a+b+c=3$ and/or of the formula,

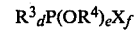

wherein $R^3$ and $R^4$ are each a hydrocarbon group having 1 to 20 carbon atoms, X is a halogen atom, and d, e and f are numbers satisfying the equations at the same time, $0 \leq d < 3$, $0 < e \leq 3$, $0 \leq f < 3$, and $d+e+f=3$ to produce a solid product, and allowing the solid product to support a titanium compound and/or a vanadium compound, and a method for producing polyolefins which comprises polymerizing olefin in the presence of a catalyst system comprising said solid catalyst component and an organoaluminum compound.

19 Claims, No Drawings

CATALYSTS FOR THE POLYMERIZATION OF OLEFINS

The present invention relates to a homopolymerization or copolymerization of olefin with a catalyst of high activity. More particularly, it relates to a method for producing olefin homopolymers or copolymers (hereinafter referred to simply as olefin polymers) of narrow particle size distribution which are in a good slurry state, using a catalyst of markedly high activity.

As to catalysts for olefin polymerization, it is well known that catalyst systems comprising combining a compound of a transition metal in Groups IVb to VIb of the Periodic Table of the Elements with an organic compound of a metal in Groups I to III of the Periodic Table, the so-called "Ziegler" catalyst, are effective for olefin polymerization. Further, many studies were made on supported catalysts comprising a carrier and the compound of a transition metal supported thereon, and as a result, it was found that inorganic compounds such as oxides, hydroxides, chlorides or carbonates of a metal or silicon, and mixtures or complexes thereof are useful as a carrier. Of these compounds, magnesium compounds are particularly useful as a carrier, and for example, magnesium halide is used as a carrier for catalysts of high activity (Japanese Patent Publication Nos. 12105/1964 and 41676/1972). The activity of these catalysts is relatively high but not always satisfactory, and the catalysts generally have a broad particle size distribution and do not always produce olefin polymers having a narrow particle size distribution. Further, there are many studies on improvements of the catalysts, but the results are not said to be satisfactory.

In producing olefin polymers, it is desirable to minimize the content of residual catalysts in the produced polymers. The residual catalysts cause many problems such as reduction in the stability and processability of the polymers and consequently require equipments for after-treatments such as removal of the residual catalysts. This disadvantage can be improved by increasing catalytic activity expressed in the weight of olefin polymer produced per unit weight of catalyst as well as of transition metal in the catalyst. And in this case, the above equipments for the removal of residual catalysts become unnecessary (the so-called "non-deashing process" can be applied), which results in that a manufacturing cost for the production of olefin polymers can be reduced. While when the slurry polymerization process is applied to the production of olefin polymers, the bulk density, average particle size and particle size distribution of the produced polymers are important factors having a large influence on productivity. Improvements in these factors decrease the amount of polymer attached to polymerization vessels and raise the efficiency of use of reactors and the efficiency of transfer, drying and granulation, thereby making it possible to raise the productivity and to reduce the manufacturing cost. Further, the produced powdery olefin polymers can be used as they are without pelletizing. Generally, however, olefin polymers produced with the supported catalyst have disadvantages such as low bulk density, small average particle size and broad particle size distribution. Consequently, supported catalyst of high activity, high bulk density and narrow particle size distribution which can produce olefin polymers applicable to the non-deashing process, are of markedly high value from the industrial point of view, and the development of such catalysts is very important.

The inventors previously found that a catalyst component comprising a solid product produced by reacting a Grignard compound with an aluminum halide and/or a silicone halide and a titanium compound and/or a vanadium compound supported thereon becomes an olefin polymerization catalyst having an outstandingly high activity when combined with an organoaluminum compound (British Pat. No. 1,554,460).

As a result of further study on the foregoing olefin polymerization catalyst having outstandingly high activity and industrial advantages, it was found that a method for preparing a solid carrier useful to produce a supported catalyst which is very high in activity not only per transition metal but also per solid catalyst component, and besides able to provide olefin polymers in good slurry state having a narrow particle size distribution which are applicable to the non-deashing process and free from adhesion to reactors. The inventors thus attained to the present invention.

An object of the present invention is to provide a solid catalyst component having both high activity and narrow particle size distribution.

Another object of the present invention is to provide a method for polymerizing olefin using a catalyst system comprising said solid catalyst component and an organoaluminum compound.

Other objects and advantages of the present invention will become apparent from the following description.

According to the present invention, there are provided a solid catalyst component prepared by a method which comprises reacting an organomagnesium compound with an alkoxy compound of the formula, $$R^1_a Al(OR^2)_b X_c$$

wherein $R^1$ and $R^2$ are each a hydrocarbon group having 1 to 20 carbon atoms, X is a halogen atom, and a, b and c are numbers satisfying the equations at the same time, $0 \leq a < 3$, $0 < b \leq 3$, $0 \leq c < 3$, and $a+b+c=3$ and/or the formula, $$R^3_d P(OR^4)_e X_f$$

wherein $R^3$ and $R^4$ are each a hydrocarbon group having 1 to 20 carbon atoms, X is a halogen atom, and d, e and f are numbers satisfying the equations at the same time, $$0 \leq d < 3, \ 0 < e \leq 3, \ 0 \leq f < 3, \text{ and } d+e+f=3$$

to produce a solid product, and allowing the solid product to support a titanium compound and/or a vanadium compound, and a method for producing olefin polymers which comprises polymerizing olefin in the presence of a catalyst system comprising said solid catalyst component and an organoaluminum compound.

As the organomagnesium compound used for the synthesis of the solid carrier in the present invention, any type of those obtained by the reaction between a halogen-containing organic compound and metallic magnesium may be used. Particularly, Grignard compounds of the formula, $R^5MgX$ (wherein $R^5$ is a hydrocarbon group having 1 to 20 carbon atoms and X is a halogen atom), and dialkylmagnesium compounds of the formula, $R^6_2Mg$ (wherein $R^6$ has the same meaning as $R^5$ above), are preferably used. The groups, $R^5$ and R$^6$, specifically include for example alkyl, aryl, aralkyl and alkenyl groups having 1 to 20 carbon atoms (e.g. methyl, ethyl, n-propyl, isopropyl, n-butyl, sec-butyl, tert-butyl, n-amyl, isoamyl, n-hexyl, n-octyl, 2-ethylhexyl, phenyl, benzyl), and the group, X, means chlorine, bromine and iodine atoms.

Specific examples of Grignard compound include for example ethylmagnesium chloride, ethylmagnesium bromide, ethylmagnesium iodide, n-propylmagnesium chloride, n-propylmagnesium bromide, n-butylmagnesium chloride, n-butylmagnesium bromide, n-amylmagnesium chloride, phenylmagnesium chloride and phenylmagnesium bromide. The dialkylmagnesium compounds specifically include for example diethylmagnesium, di-n-propylmagnesium, di-n-butylmagnesium, di-n-amylmagnesium and diphenylmagnesium. As a solvent for the synthesis of these organomagnesium compounds, ether compounds such as diethyl ether, di-n-propyl ether, diisopropyl ether, di-n-butyl ether, diisobutyl ether, di-n-amyl ether, diisoamyl ether, di-n-hexyl ether, di-n-octyl ether, diphenyl ether, dibenzyl ether, phenetole, anisole and tetrahydrofuran are used. In place of the ether compounds, hydrocarbons (e.g. hexane, heptane, octane, cyclohexane, methylcyclohexane, benzene, toluene, xylene), or mixtures of the ether compound and hydrocarbon may be used. It is desirable that the organomagnesium compounds are used as an ether solution or as complexes with an ether for the synthesis of the solid carrier. It is particularly preferred to use Grignard compounds of the formula, R$^5$MgCl, as an ether solution or as complexes with an ether.

Aluminum alkoxides among the alkoxy compounds are represented by the formula, R$^1_a$Al(OR$^2$)$_b$X$_c$, and they give good results as the number of alkoxy groups increases. Aluminum trialkoxides of the formula, Al(OR$^2$)$_3$, are most desirable. In the above formula, R$^1$ and R$^2$ are each a hydrocarbon group having 1 to 20 carbon atoms, X is a helogen atom, and a, b and c are numbers satisfying the equations at the same time, $0 \leq a < 3$, $0 < b \leq 3$, $0 \leq c 3$, $a+b+c=3$. Specific examples of aluminum alkoxide include for example Al(OCH$_3$)$_3$, Al(OC$_2$H$_5$)$_3$, Al(O—n—C$_3$H$_7$)$_3$, Al(O—iso—C$_3$H$_7$)$_3$, Al(O—n—C$_4$H$_9$)$_3$, Al(O—sec—C$_4$H$_9$)$_3$, Al(O-tert—C$_4$H$_9$)$_3$, Al(O—iso—C$_4$H$_9$)$_3$, Al(OC$_6$H$_5$)$_3$, C$_2$H$_5$Al(OC$_2$H$_5$)$_2$, C$_2$H$_5$Al(O—iso—C$_3$H$_7$)$_2$, (C$_2$H$_5$)$_2$Al(O—iso—C$_3$H$_7$), iso—C$_3$H$_7$Al(O—n—C$_4$H$_9$)$_2$, (iso—C$_3$H$_7$)$_2$Al(OC$_2$H$_5$), Al(OC$_2$H$_5$)$_2$Cl, Al(O—iso—C$_3$H$_7$)Cl$_2$, C$_2$H$_5$Al(OC$_6$H$_5$)Cl and iso—C$_4$H$_9$Al(OCH$_3$)Cl. These compounds are prepared by the well-known methods, and for example, they are obtained particularly easily by the reaction between an organoaluminum compound and an alcohol.

Phosphorus alkoxides among the alkoxy compounds are represented by the formula, R$^3_d$P(OR$^4$)$_e$X$_f$, wherein R$^3$ and R$^4$ are each a hydrocarbon group having 1 to 20 carbon atoms, X is a halogen atom, and d, e and f are numbers satisfying the following equations at the same time, $0 \leq d < 3$, $0 < e \leq 3$, $0 \leq f < 3$ and $d+e+f=3$. They give good results as the number of alkoxy groups increases.

The phosphorus alkoxides specifically include for example P(OCH$_3$)$_3$, P(OC$_2$H$_5$)$_3$, P(O—iso—C$_3$H$_7$)$_3$, P(O—n—C$_4$H$_9$)$_3$, P(OCH$_2$CH=CH$_2$)$_3$, P(OC$_6$H$_5$)$_3$, P(OCH$_2$CH$_2$Cl)$_3$, P(OCH$_3$)$_2$Cl, P(OC$_2$H$_5$)$_2$Cl, P(O—n—C$_4$H$_9$)Cl$_2$, P(OC$_6$H$_5$)Cl$_2$, CH$_3$P(OCH$_3$)$_2$, C$_2$H$_5$P(OC$_2$H$_5$)$_2$, n—C$_4$H$_9$P(OC$_6$H$_5$)$_2$, (C$_2$H$_5$)$_2$—P(OCH$_3$), (n—C$_4$H$_9$)$_2$P(OC$_6$H$_5$), CH$_3$P(OC$_2$H$_5$)Cl and C$_2$H$_5$P(OC$_6$H$_5$)Cl. Of these compounds, trialkyl phosphites of the formula, P(OR$^4$)$_3$, are most desirable.

The titanium compound and/or vanadium compound supported on carrier include for example titanium compounds of the formula, Ti(OR$^7$)$_m$X$_{4-m}$ (in which R$^7$ is a hydrocarbon group having 1 to 20 carbon atoms, X is a halogen atom, and m is a number satisfying the equation, $0 \leq m \leq 4$), vanadium tetrachloride and vanadium oxytrichloride. As specific examples of the titanium compounds, there may be given for example titanium tetrachloride, titanium tetrabromide, titanium tetraiodide, titanium tetraethoxide, titanium tetra-n-propoxide, titanium tetra-isopropoxide, titanium tetra-n-butoxide, tetrakis(2-ethylhexyl) titanate, tetrastearyl titanate, ethoxytitanium trichloride, diethoxytitanium dichloride, triethoxytitanium chloride, isopropoxytitanium trichloride, diisopropoxytitanium dichloride, tri-isopropoxytitanium chloride, n-butoxytitanium trichloride, di-n-butoxytitanium dichloride, tri-n-butoxytitanium chloride, ethoxytitanium tribromide, diethoxytitanium dibromide, triethoxytitanium bromide, n-propoxytitanium tribromide, di-n-butoxytitanium dibromide and tri-n-butoxytitanium bromide. Of these compounds, titanium tetrachloride is particularly preferred. These compounds may be used alone or in combination.

The preparation of the solid catalyst component of the present invention is always carried out in the atmosphere of inert gas such as nitrogen or argon. Reaction between the organomagnesium compound and the alkoxy compound is desirably carried out at $-30°$ C. to $150°$ C., preferably $-10°$ C. to $100°$ C. in a solvent. In carrying out this reaction, the alkoxy compound is added, as it is or in solution or dilution in a suitable solvent, to a solution of the organomagnesium compound, or the way of addition is reversed. The reaction time is not particularly limited, so far as it is enough long to complete the reaction, but generally it is 10 minutes or more, preferably 30 minutes to 5 hours. The molar ratio of organomagnesium compound to alkoxy compound is 1:10 to 10:1, preferably 1:3 to 3:1. The solvent used for this reaction includes for example aliphatic hydrocarbons (e.g. pentane, hexane, heptane, octane), aromatic hydrocarbons (e.g. benzene, toluene, xylene), alicyclic hydrocarbons (e.g. cyclohexane, cyclopentane) and ether compounds of the formula, R$^8$—O—R$^9$ (in which R$^8$ and R$^9$ are each a hydrocarbon group having 1 to 20 carbon atoms, or they may be linked together to form a ring). Specific examples of the ether compound include for example diethyl ether, di-n-propyl ether, diisopropyl ether, di-n-butyl ether, di-sec-butyl ether, di-n-amyl ether, diisoamyl ether, di-n-hexyl ether, di-n-octyl ether, diphenyl ether, dibenzyl ether, anisole, phenetole, methyl benzyl ether, and tetrahydrofuran. These solvents may be used alone or in combination.

From the reaction products thus obtained, a solid product is isolated and used as a solid carrier. Specifically, the solid product isolated by filtration is used as it is, or after washed with an inert hydrocarbon solvent such as hexane, heptane, octane, benzene, toluene, xylene, cyclohexane and the like, or after further dried. A particularly preferred solid carrier is complexes having a coordinated ether compound which are produced by carrying out this reaction in the ether compound as solvent or in the presence of the ether compound. The amount of coordinated ether can be adjusted by the reaction conditions, ether compounds and washing and drying conditions, and generally it is adjusted to 0.1 to 100% by weight, preferably 0.5 to 50% by weight, based on the weight of the solid composition exclusive of that of the coordinated ether.

The solid carrier thus obtained has a particularly good particle size distribution, showing properties outstandingly superior as carrier. Generally, the solid carrier is amorphous or markedly weakly crystalline, and the X-ray diffraction pattern of the carrier hardly shows a peak, or if it does, it shows only a very broad and weak peak at 51° to 52° ($2\theta$).

The solid carrier thus synthesized is allowed to support a titanium compound and/or a vanadium compound by the well-known methods such as impregnation or kneading. For example, the titanium compound and/or vanadium compound are brought into contact with the foregoing carrier without solvent or in a suitable inert solvent. This reaction is preferably carried out at room temperature to 150° C. The reaction product is filtered, washed with an inert hydrocarbon solvent described above and used as it is or after drying. As to the amount of titanium compound and/or vanadium compound supported, it is particularly desirable to adjust the content of titanium atom and/or vanadium atom so as to be within a range of generally 0.01 to 30% by weight, preferably 0.1 to 15% by weight based on the resulting solid catalyst component. The solid catalyst component thus obtained has a good particle form and a narrow particle size distribution like the carrier, exhibiting markedly superior properties as catalysts.

As the organoaluminum compound which forms the catalyst system for polymerization together with the foregoing solid catalyst component, compounds represented by the formula, $R^{10}{}_{3-(p+q)}Al(OR^{11})_pY_q$ (wherein $R^{10}$ and $R^{11}$ are each a hydrocarbon group having 1 to 20 carbon atoms, Y is a hydrogen or halogen atom, and p and q are numbers satisfying the equations at the same time, $0 \leq p < 3$, $0 \leq q < 3$ and $0 \leq p+q < 3$), are used. As specific examples of the compound, there may be given for example trialkylaluminum (e.g. triethylaluminum, tri-n-propylaluminum, triisobutylaluminum, tri-n-hexylaluminum), dialkylaluminum monohalides (e.g. diethylaluminum monochloride, di-n-propylaluminum monochloride, diisobutylaluminum monochloride, di-n-hexylaluminum monochloride), alkylaluminum dihalides (e.g. ethylaluminum dichloride, n-propylaluminum dichloride, isobutylaluminum dichloride, n-hexylaluminum dichloride), alkylaluminum sesquihalides (e.g. ethylaluminum sesquichloride, n-propylaluminum sesquichloride, isobutylaluminum sesquichloride, n-hexylaluminum sesquichloride), alkylaluminum hydrides (e.g. diethylaluminum hydride, diisobutylaluminum hydride), and alkylaluminum alkoxides (e.g. diethylaluminum methoxide, diethylaluminum ethoxide, diisobutylaluminum ethoxide, diethylaluminum propoxide, diisobutylaluminum butoxide, diethylaluminum phenoxide, ethylaluminum diethoxide, isobutylaluminum dibutoxide).

These organoaluminum compounds may be used alone or in combination.

The molar ratio of titanium and/or vanadium atoms in the solid catalyst component to organoaluminum compound can be selected from a range as wide as 10:1 to 1:500, but a range from 2:1 to 1:200 is particularly preferred.

The molecular weight distribution of olefin polymers can easily be controlled by varying the type of organoaluminum compound.

Olefin used in the present invention includes for example those having 2 to 15 carbon atoms such as ethylene, propylene, butene-1, butadiene, 4-methyl-pentene-1, pentene-1, hexene-1, vinylcyclohexene, styrene and divinylbenzene.

Further, the stereoregularity of the polymers of $\alpha$-olefin (e.g. propylene, butene-1) can be improved by adding an electron-donor as a third component of the catalyst system on polymerization. The electron-donor includes for example oxygen-containing organic compounds (e.g. alcohols, ethers, ketones, esters), nitrogen-containing organic compounds (e.g. amines, amides) and phosphorus-containing organic compounds (e.g. phosphines, phosphates). Specifically, there may be given for example ethyl alcohol, n-butyl alcohol, isoamyl alcohol, diethyl ether, di-n-butyl ether, diisoamyl ether, diphenyl ether, tetrahydrofuran, dioxane, acetone, acetophenone, benzophenone, acetylacetone, ethyl acetate, ethyl benzoate, ethyl p-anisate, pyridine, triethylamine, triphenyl phosphine, triphenyl phosphite, triphenyl phosphine oxide and hexamethyl phosphoric triamide (HMPA).

The present invention is useful in the production of homopolymers and copolymers of the foregoing olefins, but its effect is particularly remarkable in the production of ethylene homopolymers and copolymers of ethylene and other olefins (e.g. chiefly propylene, butene-1, 4-methylpentene-1, pentene-1, hexene-1, butadiene).

The polymerization procedure of the present invention is generally carried out by the conventional processes such as slurry polymerization process, gas-phase polymerization process and solution polymerization process. It is desirable to carry out the polymerization as follows: The solid catalyst component and organoaluminum compound are mixed in an inert hydrocarbon solvent, and the olefin is continuously supplied to the mixture at a reaction temperature between room temperature and 200° C. and at a reaction pressure between atmospheric pressure and about 100 atm. The reaction temperature and reaction pressure are not limited to the foregoing ranges, and they may be further raised. Also, for example hydrogen may be added as a molecular weight regulating agent. The polymerization may be carried out in either of a continuous form or batchwise form.

The inert hydrocarbon solvent used for polymerization includes for example aliphatic hydrocarbons (e.g. propane, butane, pentane, hexane, heptane, octane), alicyclic hydrocarbons (e.g. cyclohexane, cycloheptane) and aromatic hydrocarbons (e.g. benzene, toluene, xylene). These solvents may be used alone or in combination. Also, the spent BB fraction may be used as a polymerization solvent.

The present invention will be illustrated in more detail with reference to the following examples, and it is to be understood that the present invention is not limited to these examples within the spirit and scope of the invention.

The properties of the produced polymers were measured by the following methods:

Melt index (MI): Measured at 190° C. using a weight of 2.16 kg according to ASTM D 1238 and expressed in g/10 min.
Density: Measured according to JIS K 6760.
Bulk density: Measured according to JIS K 6721.

EXAMPLE 1

(1) Synthesis of organomagnesium compound (Grignard compound)

To a 1-liter four-necked flask equipped with a stirrer, a reflux condenser and a dropping funnel was added magnesium chip (32.0 g) for Grignard reaction, and air and moisture in the flask were completely removed by replacement with nitrogen. n-Butyl chloride (120 g) and diethyl ether (500 ml) were placed in the dropping funnel, and the mixture (about 30 ml) was dropped to magnesium to allow reaction to start (when the reaction did not begin, it was started by heating the flask a little). After the beginning of the reaction, dropping was continued so as to allow the reaction to proceed smoothly. After dropping was finished, the reaction was continued under reflux for further about 1 hour. Thereafter, the reaction solution was cooled to room temperature, and unreacted magnesium was filtered off using a glass filter.

The content of Grignard compound in diethyl ether was determined by hydrolyzing the compound with 1 N sulfuric acid, followed by back titration with 1 N sodium hydroxide (indicator, phenolphthalein). It was found that the content was 2.00 mole/liter.

(2) Synthesis of solid catalyst component

Air and moisture in a 100-ml four-necked flask equipped with a stirrer, a dropping funnel and a thermometer were thoroughly removed by replacement with nitrogen.

Aluminum triisopropoxide [Al(O—iso—$C_3H_7$)$_3$, 10.2 g] was dissolved in diethyl ether (30 ml) in the flask, and to this solution was gradually added dropwise the diethyl ether solution (25 ml) containing 50.0 mmole of n-butylmagnesium chloride synthesized in (1) from the dropping funnel with ice-cooling. White precipitate was formed. Reaction was carried out for 1 hour with ice-cooling and then at the boiling point of diethyl ether for further 1 hour. After reaction, ethyl ether was removed by filtration, and the precipitate was washed with purified n-heptane (50 ml) and filtered. This washing/filtration cycle was repeated five times, and then the precipitate was dried at room temperature under reduced pressure to obtain 5.2 g of a white solid. It was found by analysis that the contents of Mg, Al, Cl and $(C_2H_5)_2O$ in the white solid were 20.5%, 1.3%, 28.8% and 8.7% by weight, respectively. This white solid (3.0 g) was dipped in titanium tetrachloride (30 ml) in a 100-ml four-necked flask, and reaction was carried out at 130° C. for 1 hour. After the reaction was finished, the solid product was repeatedly washed with n-heptane until titanium tetrachloride in the washings was no longer detected. A solid catalyst component was thus obtained. The component was dried and analyzed, and it was found that the amount of titanium supported was 53 mg per 1 g of solid catalyst component.

The synthetic method for the above solid catalyst component is also applicable to the synthesis of other solid catalyst components.

(3) Polymerization

Air in a 1-liter stainless steel autoclave equipped with a magnetic stirrer was thoroughly replaced with nitrogen, and the autoclave was heated to 90° C. n-Heptane (500 ml) completely free from moisture and oxygen, triethylaluminum (2.5 mmole) and the foregoing solid catalyst component (4.2 mg) were added to the autoclave with stirring. Thereafter, hydrogen gas was charged to a pressure of 2 kg/cm$^2$ (gauge) and then ethylene was charged to a pressure of 12 kg/cm$^2$ (gauge) to start polymerization. Polymerization was continued at 90° C. for 1 hour while keeping the total pressure of 12 kg/cm$^2$ by supplying ethylene. After polymerization was finished, the resulting polymer was filtered, washed with n-heptane and dried at 60° C. under reduced pressure to obtain 72 g of polyethylene. The polyethylene had a melt index of 0.26 g/10 min. and a bulk density of 0.31 g/cc. In this case, the catalytic activity was 17,100 g (polyethylene)/g(solid catalyst component).hr, and in another expression, 323,000 g(polyethylene)/g Ti.hr.

EXAMPLE 2

(1) Synthesis of organomagnesium compound (Grignard compound)

To a 1-liter four-necked flask equipped with a stirrer, a reflux condenser and a dropping funnel was added magnesium chip (35.0 g) for Grignard reaction, and air and moisture in the flask were completely removed by replacement with nitrogen. n-Butyl chloride (125 g) and di-n-butyl ether (500 ml) were placed in the dropping funnel, and the mixture (about 30 ml) was dropped to magnesium to allow reaction to start. After the beginning of the reaction, dropping was continued so as to allow the reaction to proceed smoothly. After dropping was finished, the reaction was continued at 60° C. to 70° C. for further about 1 hour. Thereafter, the reaction solution was cooled to room temperature, and unreacted magnesium was filtered off using a glass filter.

The content of Grignard compound in di-n-butyl ether was determined by hydrolyzing the compound with 1 N sulfuric acid, followed by back titration with 1 N sodium hydroxide (indicator, phenolphthalein). It was found that the content was 2.10 mole/liter.

(2) Synthesis of solid catalyst component

Air and moisture in a 100-ml four-necked flask equipped with a stirrer, a dropping funnel and a thermometer were thoroughly removed by replacement with nitrogen.

The di-n-butyl ether solution (23.8 ml) containing 50 mmole of n-butylmagnesium chloride (n-BuMgCl) synthesized in (1) was placed in the flask and stirred. Thereafter, triethyl phosphite (4.2 g) was gradually added dropwise to the solution from the dropping funnel with ice-cooling. White precipitate was formed. Reaction was carried out for 1 hour with ice-cooling and then at 60° C. for further 1 hour. After reaction, di-n-butyl ether was removed by filtration, and the precipitate was washed with purified n-heptane (50 ml) and filtered. This washing and filtration cycle was repeated five times, and then the precipitate was dried at room temperature under reduced pressure to obtain 8.4 g of a white solid. It was found by analysis that the contents of Mg, P, Cl and $(n—C_4H_9)_2O$ were 20.0%, 0.3%, 25.8% and 16.8% by weight, respectively. This white solid (3.5 g) was dipped in titanium tetrachloride (30 ml) in a 100-ml four-necked flask, and reaction was carried out at 130° C. for 1 hour. After the reaction was finished, the solid product was repeatedly washed with n-heptane until titanium tetrachloride in the washings was no longer detected. A solid catalyst component (3.3 g) was thus obtained. The component was dried and analyzed, and it was found that the amount of titanium supported was 47 mg per 1 g of solid catalyst component.

The synthetic method for the above solid catalyst component is also applicable to the synthesis of other solid catalyst components.

(3) Polymerization

Polymerization was carried out in the same manner as in (3) of Example 1 except that 5.1 mg of the solid catalyst component obtained above was used. As a result, 105 g of polyethylene was obtained. This polyethylene had a melt index of 0.64 g/10 min. and a bulk density of 0.32 g/cc. The catalytic activity was 20,600 g(polyethylene)/g(solid catalyst component).hr, and in another expression, 438,000 g(polyethylene)/g Ti.hr.

EXAMPLE 3

Ethylene was polymerized in the same manner as in Example 1 except that 2.5 mmole of triisobutylaluminum was used in place of triethylaluminum, and that 3.2 mg of the solid catalyst component was used. Thus, 60.0 g of polyethylene was obtained. This polyethylene had a melt index of 0.20 g/10 min. and a bulk density of 0.30 g/cc. The catalytic activity was 18,800 g(polyethylene)/g(solid catalyst component).hr, and in another expression, 354,000 g(polyethylene)/g Ti.hr.

Thus, 81.0 g of polyethylene was obtained. This polyethylene had a melt index of 0.35 g/10 min. and a bulk density of 0.31 g/cc. The catalytic activity was 23,100 g(polyethylene)/g(solid catalyst component).hr, and in another expression, 491,000 g(polyethylene)/g Ti.hr.

EXAMPLE 5

Ethylene was polymerized in the same manner as in Example 2 except that 2.5 mmole of diethylaluminum chloride was used in place of triethylaluminum, 15.5 mg of the solid catalyst component was used, and that the hydrogen pressure was 10 kg/cm$^2$ and the total pressure was 20 kg/cm$^2$. Thus, 74.0 g of polyethylene was obtained. This polyethylene had a melt index of 0.23 g/10 min. and a bulk density of 0.34 g/cc. The catalytic activity was 4,770 g(polyethylene)/g(solid catalyst component).hr, and in another expression, 101,000 g(polyethylene)/g Ti.hr.

EXAMPLES 6 TO 12

The preparation of solid catalyst component and polymerization of ethylene were carried out in the same manner as in Example 1 but using various compounds. Preparation conditions for the solid catalyst component and the results of ethylene polymerization are shown in Table 1.

TABLE 1

| | Preparation of solid catalyst component | | | | | |
|---|---|---|---|---|---|---|
| Example | Organo-magnesium compound (ether) | R'$_a$Al(OR)$_b$X$_c$ | Mg/Al (atomic ratio) | Reaction solvent | Amount of ether coordinated (wt %) | Ti/V compound (amount supported, wt %) |
| 6 | n-BuMgCl (Et$_2$O) | Al(O—i-Pr)$_3$ | 1.0 / 0.5 | Diethyl ether | 6.3 | TiCl$_4$ (4.3) |
| 7 | n-BuMgCl (Et$_2$O) | " | 1.0 / 0.3 | Diethyl ether | 5.5 | TiCl$_4$ (4.8) |
| 8 | n-BuMgCl (THF) | Al(O—i-Pr)$_3$ | 1.0 / 1.0 | Toluene | 38.7 | TiCl$_4$ (5.8) |
| 9 | EtMgCl [(n-Bu)$_2$O] | Al(O—n-Bu)$_3$ | 1.0 / 1.0 | n-Heptane | 16.2 | TiCl$_4$ (3.5) |
| 10 | i-PrMgCl [(n-Bu)$_2$O] | Al(OEt)$_3$ | 1.0 / 1.0 | Diisoamyl ether | 23.4 | Ti(OEt)$_2$Cl$_2$ (4.7) |
| 11 | n-BuMgCl [(n-Bu)$_2$O] | Al(OC$_6$H$_5$)$_3$ | 1.0 / 1.0 | Di-n-butyl ether | 20.3 | TiCl$_4$ (5.6) |
| 12 | n-BuMgCl [(n-Bu)$_2$O] | Al(O—i-Pr)$_3$ | 1.0 / 1.0 | Di-n-butyl ether | 18.7 | VOCl$_3$ (6.4) |

| Polymerization condition | | | Catalytic activity | | | |
|---|---|---|---|---|---|---|
| Solid catalyst component (mg) | Organo-aluminum compound | Yield (g) | g(PE)/g (solid catalyst component)·hr | g(PE)/g Ti·hr | Bulk density (g/cc) | Melt index (MI) (g/10 min.) |
| 4.5 | Et$_3$Al | 71.0 | 15,800 | 367,000 | 0.31 | 0.30 |
| 4.0 | Et$_3$Al | 55.7 | 13,900 | 290,000 | 0.30 | 0.35 |
| 3.2 | (i-Bu)$_3$Al | 65.8 | 20,600 | 355,000 | 0.28 | 0.25 |
| 4.1 | (i-Bu)$_3$Al | 70.5 | 17,200 | 491,000 | 0.32 | 0.23 |
| 5.5 | Et$_3$Al | 77.6 | 14,100 | 300,000 | 0.27 | 0.08 |
| 3.1 | Et$_3$Al | 80.0 | 25,800 | 461,000 | 0.31 | 0.48 |
| 5.1 | Et$_3$Al | 37.0 | 7,250 | 113,000 | 0.28 | 0.17 |

Notes:
Et: C$_2$H$_5$, i-Pr; iso-C$_3$H$_7$
n-Bu: n-C$_4$H$_9$, i-Bu; iso-C$_4$H$_9$
THF: Tetrahydrofuran

EXAMPLE 4

Ethylene was polymerized in the same manner as in Example 2 except that 2.5 mmole of diisobutylaluminum hydride was used in place of triethylaluminum, and that 3.5 mg of the solid catalyst component was used.

EXAMPLES 13 TO 19

The preparation of solid catalyst component and polymerization of ethylene were carried out in the same manner as in Example 2 but using various compounds. The results are shown in Table 2.

TABLE 2

Preparation of solid catalyst component

TABLE 2-continued

| Example | Organo-magnesium compound (ether) | $R^3_dP(OR^4)_eX_f$ | $\frac{Mg}{P}$ (atomic ratio) | Amount of ether co-ordinated (wt %) | Ti/V compound (amount supported, wt %) |
|---|---|---|---|---|---|
| 13 | n-BuMgCl (Et$_2$O) | P(OEt)$_3$ | $\frac{1.0}{3.0}$ | 5.8 | TiCl$_4$ (5.3) |
| 14 | n-BuMgCl [(n-Bu)$_2$O] | P(O—n-Bu)$_3$ | $\frac{1.0}{1.0}$ | 16.3 | TiCl$_4$ (6.2) |
| 15 | n-BuMgCl [(n-Bu)$_2$O] | P(OPh)$_3$ | $\frac{1.0}{0.5}$ | 20.5 | TiCl$_4$ (2.8) |
| 16 | EtMgCl (THF) | P(OPh)$_3$ | " | 42.0 | TiCl$_4$ (6.5) |
| 17 | n-BuMgCl [(n-Bu)$_2$O] | P(OCH$_2$CH$_2$Cl)$_3$ | $\frac{1.0}{1.0}$ | 15.4 | TiCl$_4$ (4.8) |
| 18 | n-BuMgCl [(n-Bu)$_2$O] | n-BuP(O—i-Pr)$_2$ | " | 16.0 | VOCl$_3$ (5.0) |
| 19 | n-BuMgCl [(n-Bu)$_2$O] | P(OEt)$_2$Cl | " | 20.5 | Ti(O—n-Bu)$_2$—Cl$_2$ (3.7) |

| Polymerization conditions | | | Catalytic activity | | | |
|---|---|---|---|---|---|---|
| Solid catalyst component (mg) | Organo-aluminum compound | Yield (g) | g(PE)/g(solid catalyst component)·hr | g(PE)/g Ti·hr or g(PE)/g V·hr | Bulk density (g/cc) | (Melt index (g/10 min.) |
| 3.6 | Et$_3$Al | 80.6 | 22,400 | 423,000 | 0.31 | 0.57 |
| 3.0 | (i-Bu)$_3$Al | 75.6 | 25,200 | 406,000 | 0.32 | 0.48 |
| 4.1 | Et$_3$Al | 88.2 | 21,500 | 768,000 | 0.30 | 0.60 |
| 3.3 | (i-Bu)$_2$AlH | 77.0 | 23,300 | 358,000 | 0.28 | 0.45 |
| 4.8 | Et$_3$Al | 88.8 | 18,500 | 385,000 | 0,32 | 0.38 |
| 5.6 | " | 47.2 | 8,430 | 169,000 | 0.30 | 0.35 |
| 4.5 | (i-Bu)$_3$Al | 77.4 | 17,200 | 465,000 | 0.29 | 0.14 |

Notes:
Et; C$_2$H$_5$, i-Pr; iso-C$_3$H$_7$,
n-Bu; n-C$_4$H$_9$, Ph; C$_6$H$_5$
THF; Tetrahydrofuran

EXAMPLE 20

90.0 Grams of an ethylene/propylene copolymer was obtained by the same polymerization procedure as in Example 1 except that 3.1 mg of the solid catalyst component used in Example 1 was used, 10 g of propylene was added, and that the polymerization was carried out at 70° C. for 30 minutes. This copolymer contains 15.0 methyl groups per 1000 carbon atoms. The physical properties of the copolymer were as follows: density, 0.940 g/cm$^3$; melt index, 0.18 g/10 min.; bulk density, 0.30 g/cc. The catalytic activity was 58,100 g(polymer)/g(solid catalyst component).hr, and in another expression, 1,520,000 g(polymer)/g Ti.hr.

EXAMPLE 21

75.5 Grams of an ethylene/butene-1 copolymer was obtained by the same polymerization procedure as in Example 1 except that 3.0 mg of the solid catalyst component used in Example 2 was added, 10 g of butene-1 was added, and that the polymerization was carried out at 70° C. for 30 minutes. This copolymer contained 5.0 ethyl groups per 1000 carbon atoms. The physical properties of the copolymer were as follows: density, 0.942 g/cm$^3$; melt index, 0.38 g/10 min.; bulk density, 0.40 g/cc. The catalytic activity was 50,300 g(polymer)/g-(solid catalyst component).hr, and in another expression, 1,070,000 g(polymer)/g Ti.hr.

EXAMPLE 22

94.6 Grams of an ethylene/butene-1 copolymer was obtained by the same polymerization procedure as in Example 1 except that the amount of solid catalyst component used in Example 2 was 3.1 mg, 250 g of butene-1 was used in place of 500 ml of n-heptane, the polymerization temperature was 50° C., and that the hydrogen pressure, ethylene pressure and total pressure were 2.5 kg/cm$^2$, 18 kg/cm$^2$ and 27 kg/cm$^2$ (partial pressure of butene-1 at 50° C. was 6.5 kg/cm$^2$), respectively. This copolymer contained 18.5 ethyl groups per 1000 carbon atoms. The physical properties of the copolymer were as follows: density, 0.924 g/cm$^3$; melt index, 0.35 g/10 min.; bulk density, 0.42 g/cc. The catalytic activity was 30,500 g (polymer)/g(solid catalyst component).hr, and in another expression, 649,000 g(polymer)/g Ti.hr.

EXAMPLE 23

Air in a 1-liter stainless steel autoclave equipped with a magnetic stirrer was thoroughly replaced with nitrogen, and the solid catalyst component (10.5 mg) used in Example 1, triethylaluminum (2.5 mmole) and liquid propylene (300 g) were added thereto. Polymerization was then carried out at 60° C. for 1 hour. After polymerization was finished, propylene was purged, and the product was taken out and dried at 60° C. under reduced pressure to obtain 92.0 g of polypropylene. The boiling n-heptane-insoluble portion of this polypropylene was 38.5% by weight. The catalytic activity was 8,760 g(polypropylene)/g(solid catalyst component).hr, and in another expression, 165,000 g(polypropylene)/g Ti.hr.

EXAMPLES 24 to 26

Propylene was polymerized in the same manner as in Example 23 except that the amount of solid catalyst component shown in Table 3 was changed, and that the amount of electron donor shown in Table 3 was added as a third component on polymerization. The results are shown in Table 3.

TABLE 3

| Example | Solid catalyst component (Example No.) (mg) | Polymerization conditions Organo-aluminum compound | Third component | Amount of third component (mole) | Yield (g) | Catalytic activity g(pp)/g(solid catalyst component)·hr | g(pp)/g Ti·hr | n-heptane insoluble portion (%) |
|---|---|---|---|---|---|---|---|---|
| 24 | Example 2 25.0 | $(C_2H_5)_3Al$ | Ethyl p-anisate | 1.0 | 30.0 | 1,200 | 25,500 | 91.0 |
| 25 | Example 1 18.5 | " | Acetone | 2.5 | 55.2 | 2,980 | 56,300 | 68.5 |
| 26 | Example 1 25.0 | " | Hexamethyl phosphoric triamide (HMPE) | 0.5 | 87.5 | 3,500 | 66,000 | 75.0 |

What is claimed is:

1. A solid catalyst component for olefin polymerization prepared by a method consisting essentially of reacting an organomagnesium compound represented by the formula, $$R^5MgX \text{ or } R^6{}_2Mg$$

wherein $R^5$ and $R^6$ are each alkyl, aryl, aralkyl or alkenyl group having 1 to 20 carbon atoms, and X is a chlorine, bromine or iodine atom, $$R^1{}_aAl(OR)_bX_c$$

with an alkoxy aluminum compound of the formula wherein $R^1$ and $R^2$ are each a hydrocarbon group having 1 to 20 carbon atom, X is a halogen atom and a,b, and c are numbers satisfying the equations at the same time, $$0 \leq a < 3, \ 0 < b < 3, \ 0 \leq c < 3, \ a+b+c=3$$

to produce a solid product which is a catalyst carrier, and supporting a titanium compound and/or a vanadium compound on said solid product.

2. A solid catalyst component according to claim 1, wherein said solid product is produced in the presence of an ether compound and isolated from the reaction mixture.

3. A solid catalyst component according to claim 2, wherein said solid product isolated from the reaction mixture is complexes having a coordinate ether compound.

4. A solid catalyst component according to claim 1, wherein the molar ratio of the organomagnesium compound to the alkoxy compound is 1:10 to 10:1.

5. A solid catalyst component according to claim 4, wherein the molar ratio of the organomagnesium compound to the alkoxy compound is 1:3 to 3:1.

6. A solid catalyst component according to claim 1, wherein the reaction between the organomagnesium compound and the alkoxy compound is carried out at $-30°$ C. to 150° C.

7. A solid catalyst component according to claim 6, wherein the reaction between the organomagnesium compound and the alkoxy compound is carried out at $-10°$ to 100° C.

8. A solid catalyst component according to claim 1, wherein the reaction is carried out in a solvent selected from the group consisting of aliphatic hydrocarbons, aromatic hydrocarbons, alicyclic hydrocarbons and ethers.

9. A solid catalyst component according to claim 2, 3 or 8, wherein the ether compound is one represented by the formula, $$R^8-O-R^9$$

wherein $R^8$ and $R^9$ are each a hydrocarbon group having 1 to 20 carbon atoms, or may be linked together to form a ring.

10. A solid catalyst component according to claim 9, wherein the ether compound is a member selected from the group consisting of diethyl ether, di-n-propyl ether, diisopropyl ether, di-n-butyl ether, di-sec-butyl ether, di-n-amyl ether, di-isoamyl ether, di-n-hexyl ether, di-n-octyl ethyl, diphenyl ether, dibenzyl ether, anisole, phenetole, methyl benzyl ether and tetrahydrofuran.

11. A solid catalyst component according to claim 1, wherein said alkoxy aluminum compound, is an aluminum trialkoxide.

12. A solid catalyst component according to claim 1, wherein said titanium compound or vanadium compound is a titanium compound of the formula, $$Ti(OR^7)_mX_{4-m}$$

wherein $R^7$ is a hydrocarbon group having 1 to 20 carbon atoms, X is a halogen atom, and m is a number satisfying the equation, $0 \leq M \leq 4$, vanadium tetrachloride or vanadium oxytrichloride.

13. A solid catalyst component according to claim 12, wherein the titanium compound of the formula, $Ti(OR^7)_mX_{4-m}$ (in which $R^7$, X and m are as defined above), is titanium tetrachloride.

14. A solid catalyst component according to claim 3, wherein the isolated solid product contains 0.1 to 100 wt% of said coordinated ether compound.

15. A solid catalyst component according to claim 14, wherein the amount of the coordinated ether is 0.5 to 50 wt%.

16. A solid catalyst component according to claim 1, wherein the content of titanium atom and/or vanadium atom in the solid catalyst component is 0.01 to 30wt%.

17. A solid catalyst component according to claim 16, wherein the content of titanium atom and/or vanadium atom is 0.1 to 15 wt%.

18. A catalyst system for olefin polymerization comprising (1) a solid catalyst component according to any one of claims 1-3, 4,5,6,7,8,9, 11 and 12,13,14,15,16,17 and (2) an organoaluminum compound of the formula, $$R^{10}{}_{3-(p+q)}Al(OR^{11})_pY_q$$

wherein $R^{10}$ and $R^{11}$ are each a hydrocarbon group having 1 to 20 carbon atoms, Y is a hydrogen or halogen atom, and p and q are numbers satisfying the equations at the same time, $0 \leq p < 3$, $0 \leq q < 3$ and $0 \leq p+q < 3$.

19. A catalyst system for olefin polymerization comprising (1) a solid catalyst component according to claim 10 and (2) an organoaluminum compound of the formula, $$R^{10}{}_{3-(p+q)}Al(OR^{11})_p X_q$$

wherein $R^{10}$ and $R^{11}$ are each a hydrocarbon group having 1 to 20 carbon atoms, Y is a hydrogen or halogen atom, and p and q are numbers satisfying the equations at the same time, $0 \leq p < 3$, $0 \leq q < 3$, and $0 \leq p+q < 3$.

* * * * *